United States Patent
Vigren et al.

(10) Patent No.: US 6,581,718 B1
(45) Date of Patent: Jun. 24, 2003

(54) STEERING ARRANGEMENT FOR ARTICULATED TRACKED VEHICLES

(75) Inventors: Mats Vigren, Docksta (SE); Max Thoren, Ornskoldsvik (SE)

(73) Assignee: Alvis Hagglunds Aktiebolag, Ornskoldsvik (SE)

( * ) Notice: Subject to any disclaimer, the term of this patent is extended or adjusted under 35 U.S.C. 154(b) by 0 days.

(21) Appl. No.: 09/868,335

(22) PCT Filed: Dec. 16, 1999

(86) PCT No.: PCT/SE99/02394

§ 371 (c)(1),
(2), (4) Date: Sep. 25, 2001

(87) PCT Pub. No.: WO00/35735

PCT Pub. Date: Jun. 22, 2000

(30) Foreign Application Priority Data

Dec. 16, 1998 (SE) ................................................ 9804362

(51) Int. Cl.[7] .......................... B62D 11/00; B62D 12/02; B62D 53/02
(52) U.S. Cl. ........................................ 180/420; 180/14.4
(58) Field of Search ................................ 180/418, 419, 180/420, 14.1, 14.2, 14.3, 14.4, 14.5, 14.6, 14.7; 280/426

(56) References Cited

U.S. PATENT DOCUMENTS

| | | | | |
|---|---|---|---|---|
| 2,933,143 A | | 4/1960 | Robinson et al. | |
| 3,302,742 A | * | 2/1967 | Sunderlin | 180/420 |
| 4,111,273 A | * | 9/1978 | Blackburn et al. | 180/14.1 |
| 5,180,028 A | * | 1/1993 | Perrenoud, Jr. | 180/235 |
| 5,632,350 A | * | 5/1997 | Gauvin | 180/14.4 |
| 5,725,063 A | * | 3/1998 | Ceragioli et al. | 180/14.4 |

FOREIGN PATENT DOCUMENTS

EP            0 360 640            3/1990

* cited by examiner

Primary Examiner—Kevin Hurley
(74) Attorney, Agent, or Firm—Young & Thompson

(57) ABSTRACT

An arrangement for the steering and coupling together of two associated tracked units to form an articulated tracked vehicle set, includes a first upright for releasable coupling to a fixture on one of the tracked units, a second upright for coupling to a fixture on the other tracked unit, a first steering link which is connected in an articulated manner to the first upright about a first horizontal axis and a second steering link which is connected in an articulated manner to the second upright about a second horizontal axis, parallel with the first horizontal axis. The first and second steering links are mutually joined to a steering link unit about a steering pivot with a vertical axis of articulation. Hydraulic ram cylinder units are arranged so as to control relative turning movements between the first upright and the steering link unit, between the second upright and the steering link unit, and between the first and second steering links. The first upright is formed so as to be able to be anchored rigidly in one of the tracked units while the second upright is formed so as to be capable of rotation in bearings in the fixture on the other tracked unit about a longitudinal horizontal axis.

16 Claims, 4 Drawing Sheets

STEERING ARRANGEMENT FOR ARTICULATED TRACKED VEHICLES

The present invention relates to an arrangement for the steering and coupling together of two associated tracked units to form an articulated tracked vehicle set.

In a previously known steering arrangement for an articulated tracked vehicle set, a front and a rear tracked unit are coupled together by means of a link mechanism which has an essentially vertical axis of articulation about which both tracked units can be turned relative to one another by means of a pair of hydraulic cylinders. The known steering arrangement has, by virtue of its design, certain limitations with regard to characteristics such as steering geometry, controllable articulation between the vehicle units, controllable damping of the movements of the vehicle units relative to one another and the uncoupling possibilities. In the development of larger and heavier tracked vehicle units such characteristics are of increasing importance.

One object of the present invention is thus to make available a steering arrangement which makes possible better control of the articulation between tracked vehicle units of an articulated tracked vehicle set.

A second object of the present invention is to make available a rapid and simple means of coupling and uncoupling two tracked vehicle units.

A further object of the present invention is to make available a steering arrangement with improved steering geometry.

For the achievement of these objects, the steering arrangement according to the present invention is characterized in that it comprises a first upright formed so that it can be releasably coupled to a fixture on one of the tracked vehicle units, a second upright formed so that it can be coupled to a fixture on the other tracked vehicle unit, a first steering link which is connected in an articulated manner to the first upright about a first horizontal, transverse axis, and a second steering link which is connected in an articulated manner to the second upright about a second horizontal, transverse axis which is parallel with the first horizontal axis, and in that the first and second steering links are mutually joined to a steering link unit about a steering pivot with a vertical axis of articulation, in that at least a first hydraulic ram cylinder unit is mounted on the first upright and connected to the steering link unit in order to control relative turning movements between the first upright and the steering link unit about the first horizontal, transverse axis, in that at least a second hydraulic ram cylinder unit is mounted on the second upright and connected to the steering link unit in order to control relative turning movements between the second upright and the steering link unit about the second horizontal, transverse axis, and in that at least a third hydraulic cylinder ram unit is connected between the first and second steering links in order to control relative turning movements between these steering links about the point of articulation, in which the first upright is formed so as to be able to be anchored rigidly in one of the tracked vehicle units and the second upright is formed so as to be capable of rotation in bearings in the fixture in the other tracked vehicle unit about a longitudinal horizontal axis. As a result of such an embodiment of the steering arrangement according to the invention, the design permits the tracked vehicle units firstly to rotate relative to one another about a longitudinal, horizontal axis, secondly to turn relative to one another about two parallel, transverse horizontal axes, thirdly to be uncoupled with the whole of the steering unit remaining fixed to one of the tracked vehicle units, and lastly to be provided with better steering geometry with the vertical axis of articulation positioned centrally between the two tracked vehicle units which are to be coupled together.

Further special characteristics and advantages of the present invention are described in more detail below and in the following dependent patent claims with reference to the enclosed drawings, in which:

Figure 1:
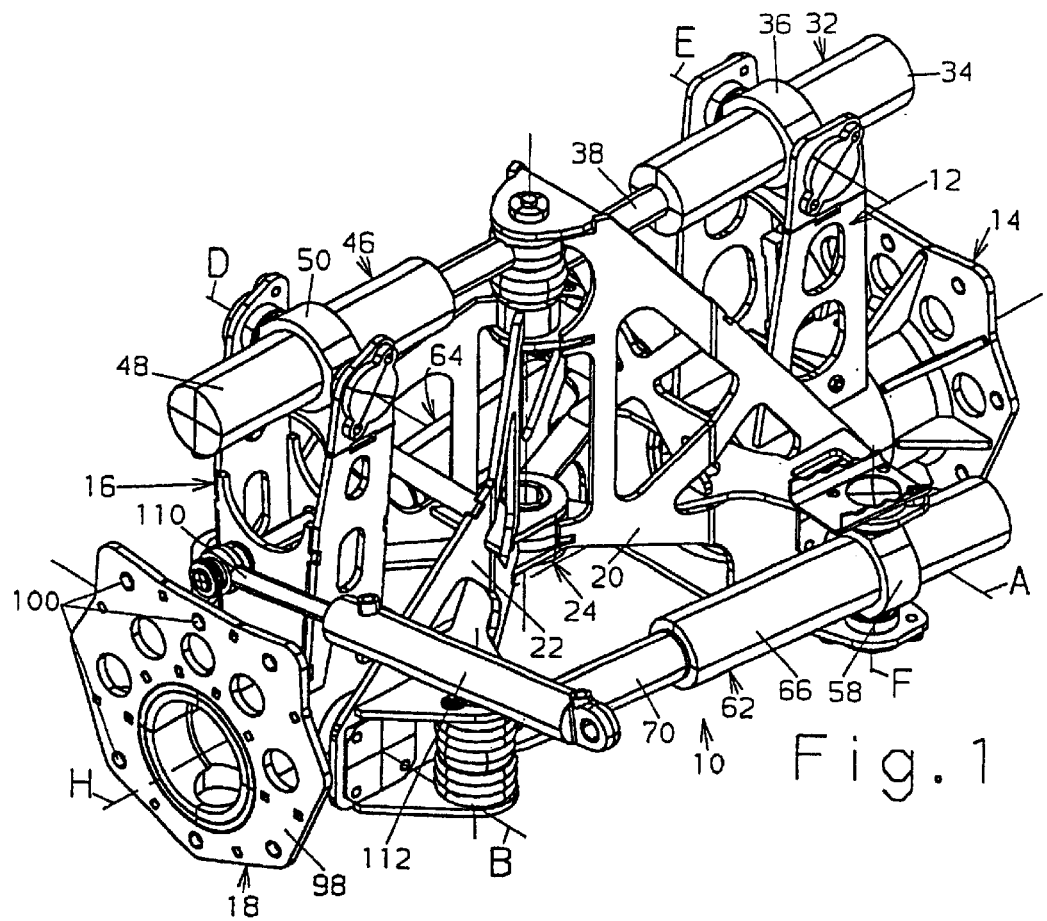
FIG. 1 is a perspective view of a steering arrangement according to the present invention, seen obliquely from the rear.
Figure 2:
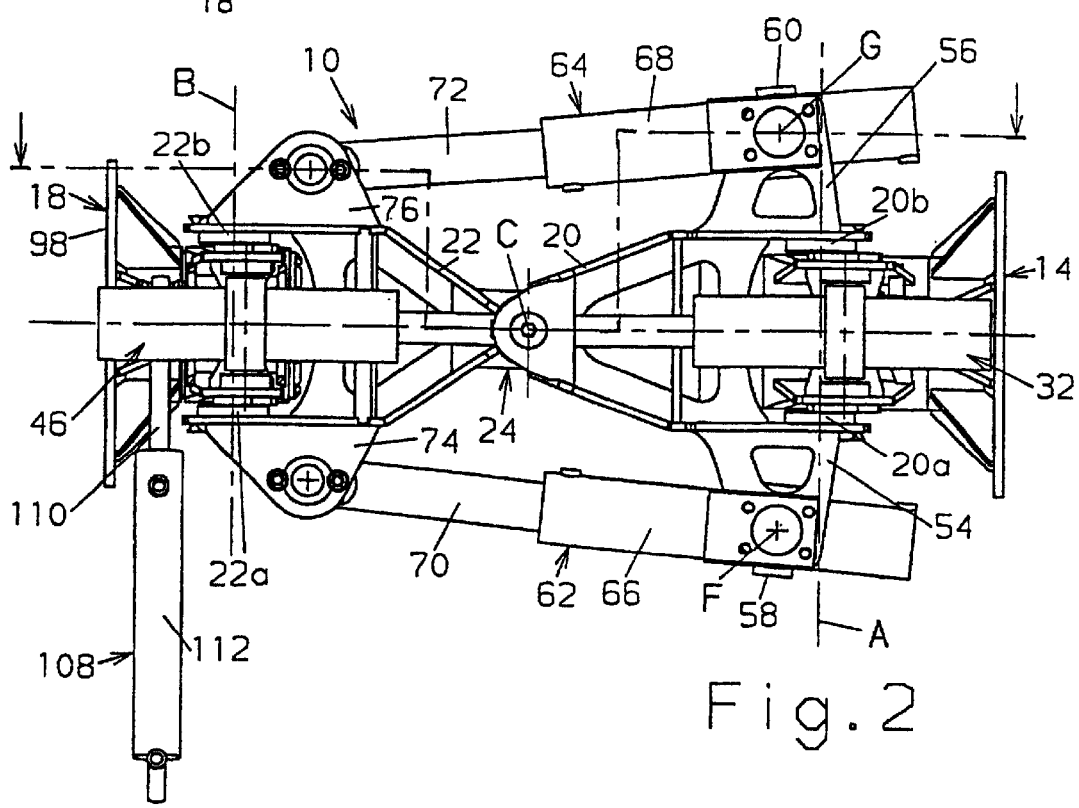
FIG. 2 is a plan view of the steering arrangement in FIG. 1.

In FIGS. 1 and 2, 10 refers generally to a first embodiment of a steering arrangement according to the invention, for an articulated tracked vehicle set, not shown, comprising a front and a rear tracked vehicle unit. The steering arrangement 10 comprises a first upright 12 which is intended to be mounted rigidly and releasably on a permanently attached fixture 14 on one of the tracked vehicle units. In the embodiment shown, the fixture 14 is intended to be mounted on the rear end of the front tracked vehicle unit of the set. The steering arrangement 10 further comprises a second upright 16 which is intended to be mounted so as to be capable of rotation on a permanently secured fixture 18 on the rear tracked vehicle unit. A first steering link 20 is attached to the first upright 12 so as to be capable of turning about a first transverse horizontal axis A while a second steering link 22 is attached to the second upright 16 so as to be capable of turning about a second transverse horizontal axis B. The steering links 20, 22 are connected in an articulated manner to one another via a steering pivot 24 with a vertical axis of articulation C and constitute a steering link unit 26.

Figure 3:
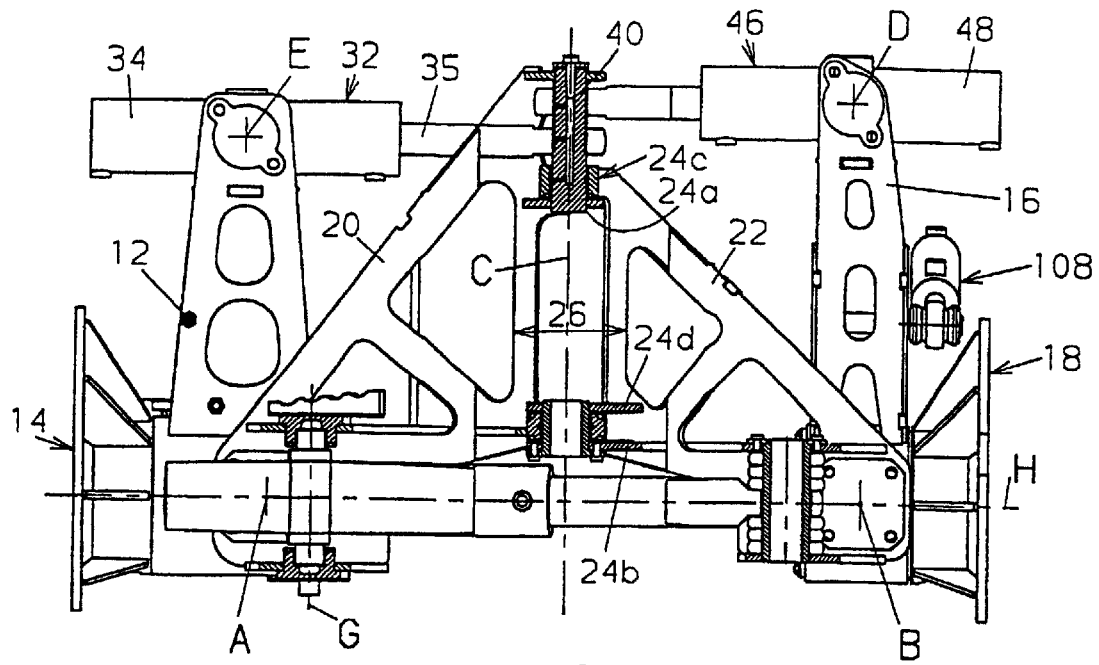
FIG. 3 is a partial cross-sectional side view of the steering arrangement.
Figure 4:
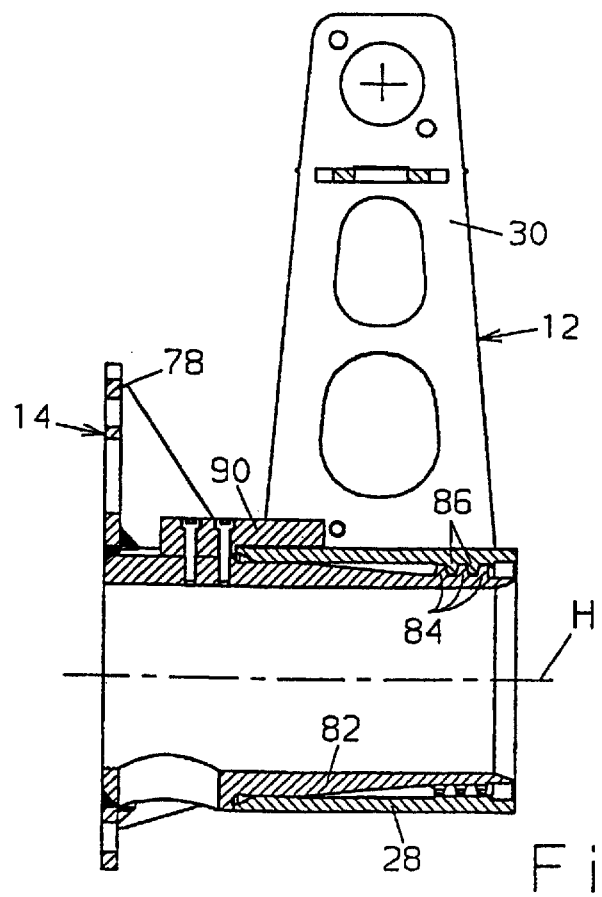
FIG. 4 is a cross-sectional side view of a constituent upright in the steering arrangement according to the invention, which upright is mounted rigidly on a fixture intended to be attached permanently to one of the two associated tracked vehicle units.
Figure 6:
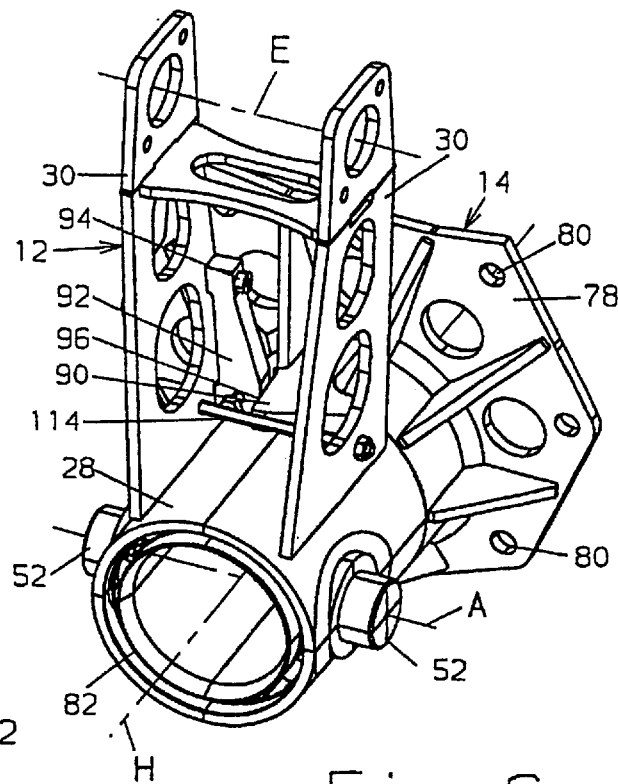
FIG. 6 is a perspective view of the fixture and the upright in FIG. 4.

As is clearly shown in FIGS. 4 and 6, the first upright 12 comprises a sleeve-shaped hub 28 with two essentially parallel, upright side pieces 30 which between them and at the top support a hydraulic ram cylinder unit 32. A cylinder part 34 of this unit is mounted in a support 36 which is mounted in bearings in the upper part of the upright 12 so as to be capable of rotation about a third transverse horizontal axis E while an outer end of a ram piston part 38 of the hydraulic ram cylinder unit 32 is connected in an articulated manner to the steering link unit 26 via a vertical steering peg 40 (FIG. 3) which protrudes coaxially from the steering pivot 24, i.e. is coaxial with the vertical axis of articulation C.

The second upright 16 similarly comprises a sleeve-shaped hub 42 (FIG. 7) with two essentially parallel, upright side pieces 44 which between them and at the top support a hydraulic ram cylinder unit 46. This has a cylinder part 48 which is mounted in a support 50 which is mounted in bearings in the upper part of the upright 16 about a fourth transverse horizontal axis D which is parallel with the horizontal axes A, B and E.

The first, front steering link 20 has a fork-shaped front part, the legs 20a, 20b of which straddle the hub 28 of the first upright 12 and are rotatably mounted on corresponding steering pegs 52 (FIG. 6) on the hub 28, whereby the pegs 52 constitute the abovementioned first transverse horizontal axis A. Furthermore, the steering link 20 has an upright rear part which comprises two vertically separated steering guide parts, namely an upper steering guide part 24a and a lower steering guide part 24b (FIG. 3).

Correspondingly, the second, rear steering link 22 has a fork-shaped rear part, the legs 22a, 22b of which straddle the hub 42 of the second upright 16 and are rotatably mounted on corresponding steering pegs (not shown) on the hub 42, whereby the pegs constitute the abovementioned second transverse horizontal axis B. The steering link 22 also has an upright front part which comprises two vertically separated steering guide parts, namely an upper steering guide part 24c and a lower steering guide part 24d. The steering guide parts 24a and 24c, and 24b and 24d of the steering links 20, 22, thus together constitute the steering pivot 24 about the vertical axis of articulation C.

On the outside of the legs 20a, 20b of the first steering link 20, brackets 54, 56 are mounted to carry holders 58, 60 for the respective hydraulic steering cylinder units 62 and 64. The cylinder parts 66 and 68 of the respective steering cylinder units 62, 64 are mounted in an articulated manner in bearings in the brackets 54, 56 about vertical axes F and G, while their piston parts 70, 72 are connected in an articulated manner to side brackets 74 and 76 on the second, rear steering link 22. The steering cylinder units 62, 64 are arranged to work together in such a way that when the one piston part 70, 72 is drawn into its cylinder part 66, 68, the second piston part 72, 70 is expressed from its cylinder part 68, 66 so that the vertical steering pivot is displaced to either side from its neutral position in FIG. 2. This allows the associated tracked vehicle units to be steered either to left or right about the vertical axis.

The four parallel transverse horizontal axes A, B, D and E make it possible for the steering arrangement 10, and hence the associated tracked vehicle units, to perform vertical turning and articulating movements in which the horizontal axes A, B, D and E can act as guide pivots in a parallelogram so that the uprights 12, 16, and thus the tracked vehicle units can also perform mutually parallel movements vertically. The hydraulic ram cylinder units 32, 46 are designed to act as hydraulic shock absorbers to damp vertical turning movements between the tracked vehicle units during driving. These shock absorbers advantageously also have an inbuilt function as active, pressure-adjustable manoeuvring rams by means of which the tracked vehicle units can, when required, be raised or angled upwards in order, for example, to surmount an obstacle.

Figure 5:
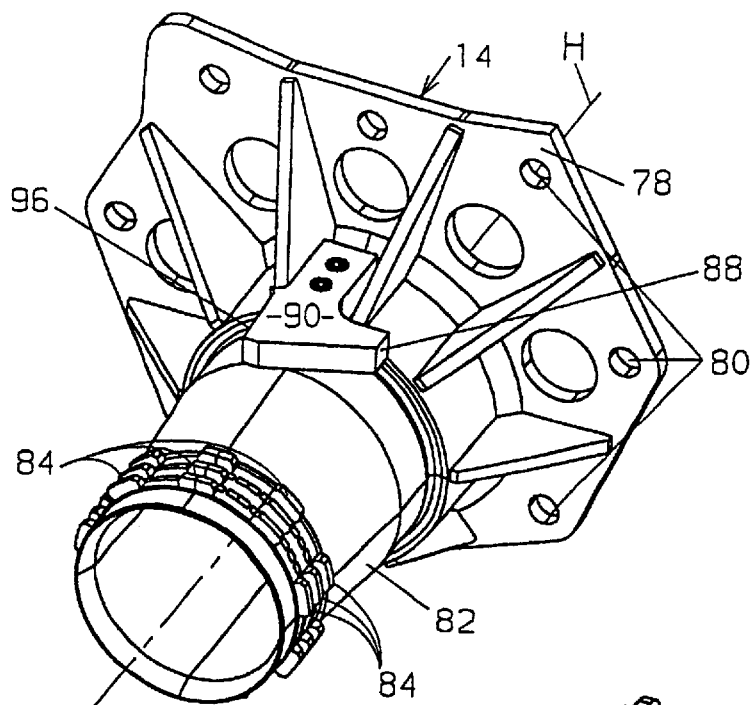
FIG. 5 is a perspective view of the fixture in FIG. 4.

In accordance with the present invention, the steering arrangement described above is arranged to be attached rigidly and releasably to a fixture in one of the tracked vehicle units and attached to a fixture in the other tracked vehicle unit so that it is capable of rotation about a horizontal transverse axis. In the embodiment shown (see FIGS. 4–6) the fixture 14 has a base plate 78 with a number of holes 80 to enable the fixture 14 to be attached to the rear of the front tracked vehicle unit by means of a number of screw fixings, not shown. From the base plate 78, a horizontal, longitudinal, hollow bearing tube 82 protrudes backwards, which bearing tube 82 is dimensioned to receive the hub 28 of the first upright 12. The bearing tube 82 and the hub 28 have matching bayonet locking parts to make possible rapid securing and releasing between the fixture 14 and the upright 12 and thus the whole steering arrangement 10. For this purpose, axially separated rows of circumferentially separated teeth 84 protrude close to the end portion of the bearing tube 82 while the hub 28 has, on its inner surface, complementary rows of teeth 86 which, by an axial movement of the hub 28 over the bearing tube 82, can be inserted in the circumferentially separated gaps between the teeth 84 on the bearing tube 82, after which the hub 28 in the case shown can be turned approximately 20° in an anti-clockwise direction, seen in FIG. 6, so that the teeth 86 then fit closely in the axial gaps between the corresponding teeth 84 on the bearing tube, thus fixing the hub 28 axially on the bearing tube 82. At the same time, locking in the circumferential direction between the bearing tube 82 and the hub 28 can be achieved by the inside of the right hand side piece 30 of the upright 12 shown in FIG. 6 coming to the stop position against the face 88 of an axial locking tongue 90 on the fixture 14. A locking catch 92, which is mounted in bearings and free to rotate about a pin 94 on the inside of the opposite side piece 30, can then be swung down and wedged securely in position between the last named side piece 30 and an opposing, slightly inclined face 96 of the locking tongue 90. Release of the hub 28 from the bearing tube 82 is achieved by reversing this sequence of actions.

The fixture 18 for the opposite end of the steering arrangement 10 comprises a base plate 98 with a number of holes 100 to enable the fixture 18 to be attached to the front of the rear tracked vehicle unit by means of a number of screw fixings not shown. From the base plate 98, a horizontal, longitudinal, hollow bearing tube 102 projects forwards, which bearing tube 102 is dimensioned to receive the hub 42 of the second upright 16 (see FIG. 7). In contrast to the rigid attachment of the steering arrangement 10 to the front fixture 14, the hub 42 is arranged to be permanently fixed in an axial direction and capable of rotation in bearings on the bearing tube 102 in order thereby to permit sideways articulation of the front and rear tracked vehicle units without subjecting the parts of the steering arrangement to undesired torsional loads.

Figure 7:
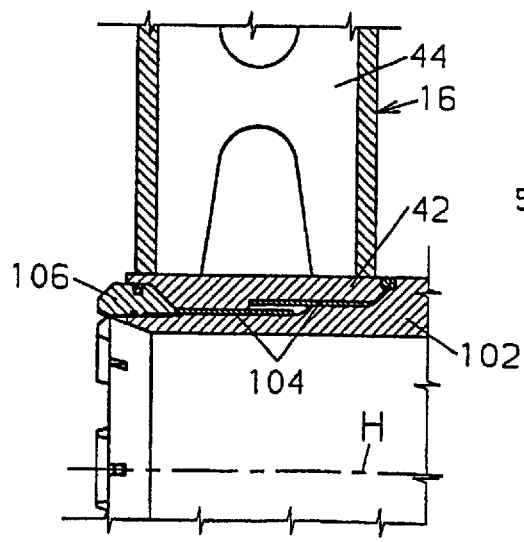
FIG. 7 is a cross-sectional side view of a part of an upright which is rotatable in bearings on a fixture intended to be attached permanently to the other of the two associated tracked vehicle units.

As shown in FIG. 7, the hub 42 is mounted in bearings so that it can rotate on the bearing tube 102 over the slide bearing 104 while being axially locked on the bearing tube 102 by means of a nut 106.

In order to damp the mutual turning movements between the steering arrangement 10 and the rear tracked vehicle unit about the longitudinal horizontal axis H through the bearing tube 102, a transverse hydraulic ram cylinder unit 108 is used, the piston 110 of which is connected in an articulate manner to the rear upright 16 and the cylinder 112 of which is connected in an articulate manner to the associated rear tracked vehicle unit. Like the hydraulic ram cylinder units 32, 46, the hydraulic ram cylinder unit 108 also has an inbuilt function as an active, pressure-adjustable manoeuvring cylinder by means of which the whole steering arrangement 10 can be turned about the axis H during the connecting and disconnecting of the steering arrangement 10 to the fixture 14 on the front tracked vehicle unit, i.e. in order to lock and open the bayonet lock 84, 86.

By means of the bearing tubes 82, 102 being hollow and the vertical steering pivot 24 being situated above the longitudinal horizontal axis H, a universal drive shaft, not shown, for the transfer of power to the driving tracks of the rear tracked vehicle unit can be located advantageously to pass through these bearing tubes 82, 102.

The described steering arrangement 10 according to the invention is thus intended, with the tracked vehicle units in the uncoupled state, to be carried wholly on one of the tracked vehicle units, in the case shown on the rear tracked vehicle unit. When the tracked vehicle units are coupled together, the hydraulic ram cylinder units 32, 46, 108 and the steering cylinder units 62, 64 can be manoeuvred as necessary in order to guide the bearing tube 82 on the front fixture 14 into the hub 28 on the front upright 12 and thereafter to turn the hub 28 through approximately 20° in order to lock the bayonet lock 84, 86 for the axial fixing of the steering arrangement 10 to the fixture 14. The locking catch 92 is then swung down into the space between the face 96 of the locking tongue 92 and the inside of the one side piece 30. The locking catch 92 can be secured in position by means of a pin 114 (FIG. 6).

Figure 8:
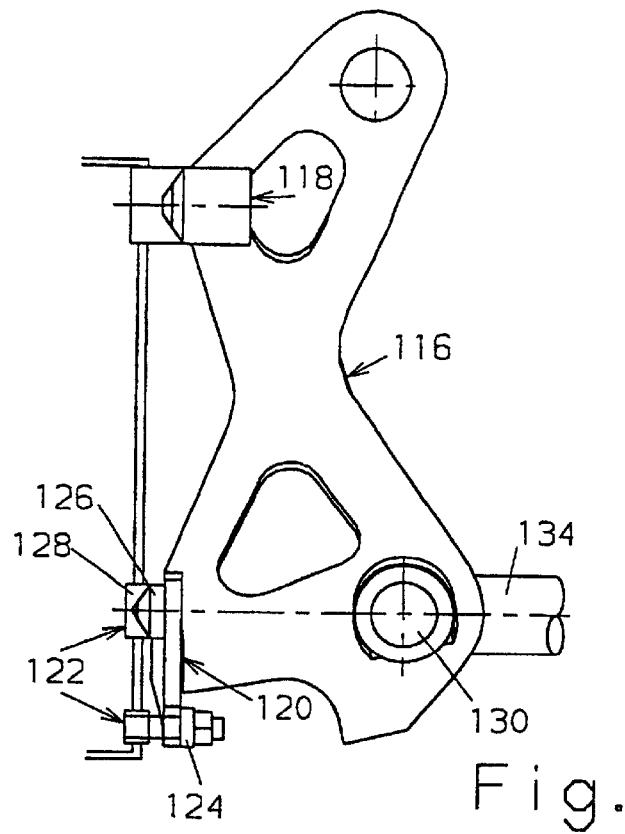
FIG. 8 is a side view of an alternative, simplified embodiment of the upright and the fixture in FIG. 4.
Figure 9:
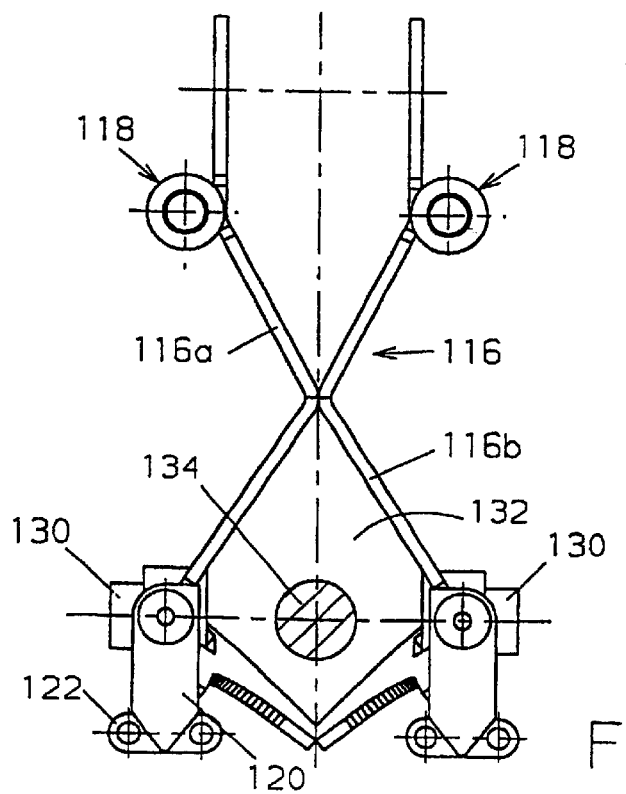
FIG. 9 is an end view of the upright in FIG. 8.

FIGS. 8 and 9 show schematically an alternative embodiment of the first upright of the steering arrangement, namely the upright which is intended to be attached rigidly to the one tracked vehicle unit. The upright 116 in this embodiment has essentially simpler design elements for the purpose of achieving a releasable, rigid attachment to the fixture on the front tracked vehicle unit. The upright 116 has, instead of a hub, upper and lower fixing devices 118, 120 which can be attached directly to the corresponding fixing devices on the tracked vehicle unit. The lower fixing devices 120 can be of the hook-on type so as to be easily hooked onto the lower fixtures 122 on the tracked vehicle unit. The fixing devices 120 can for this purpose comprise a downward-pointing hook which can engage behind a locking piece 124 on the tracked vehicle unit. A support heel 126 on the upper part of the locking hook 120 can, in the mounting position, bear against a stay 128 on the lower fixture 122. The upper fixing devices 118 comprise guides for a screw connection. Alternatively, although not shown in the drawing, the upright 116 can have two upper and two lower fixing devices of the same type as the fixing devices 118, whereby the fixing devices of the hook-on type are omitted. Such an embodiment of the upright 116 can thus in a very simple and rapid manner be attached rigidly to an associated tracked vehicle unit by means of only two or four screws. The upright 116 can generally be built up from two angularly bent side pieces 116a, 116b (FIG. 9) and equipped with guide pegs 130 for a steering link, not shown, similar to the steering link in the first embodiment. The angular bending of the side pieces 116a, 116b is preferably such that a space 132 is created to allow for the passage of a universal drive shaft 134. When the upright 116 according to FIGS. 8 and 9 is coupled to the front tracked vehicle unit, the locking hooks 120 are hooked first onto the locking pieces 124, after which the upright 116 is swung upwards with the hooks as a hinge and fixed with two screws at 118. In the alternative embodiments described above, the turning cylinder arrangement as well as the hub 28 and its associated bayonet locking system 84, 86 (FIGS. 4 and 5), can be omitted from the design.

When mention is made, in the above-described embodiments of the steering arrangement according to the invention and in the following patent claims, of "horizontal" or "vertical" components and axes, this refers to an imagined neutral position of the tracked vehicle set when this is standing on a horizontal surface.

Even if the described embodiments of the steering arrangement according to the invention relate to a variant in which the steering arrangement is attached rigidly and releasably to a fixture on the front tracked vehicle unit and attached rotatably to a fixture on the rear tracked vehicle unit, it is of course possible within the scope of the invention to permit the steering arrangement to be permanently mounted on the front tracked vehicle unit. It is similarly conceivable in the first embodiment to reverse the locations of the bearing pegs and hubs, i.e. that the uprights have a hollow peg which can be inserted in a sleeve-shaped hub on the respective fixings.

What is claimed is:

1. Arrangement for the steering and coupling together of two associated tracked vehicle units to form an articulated tracked vehicle set, characterized in that the arrangement comprises
    a) a first upright (12, 116), formed so that it can be releasably coupled to a fixture (14, 122) on one of the tracked vehicle units;
    b) a second upright (16), formed so that it can be coupled to a fixture (18) on the other tracked vehicle unit;
    c) a first steering link (20) which is connected in an articulated manner to the first upright (12, 116) about a first horizontal, transverse axis (A);
    d) a second steering link (22) which is connected in an articulated manner to the second upright (16) about a second horizontal, transverse axis (B) which is parallel with the first horizontal axis (A); that
    e) the first and second steering links (20, 22) are mutually joined to a steering link unit (26) about a steering pivot (24) with a vertical axis of articulation (C); that
    f) at least a first hydraulic ram cylinder unit (32) is mounted on the first upright (12, 116) and connected to the steering link unit (26) in order to control relative turning movements between the first upright (12, 116) and the steering link unit (26) about the first horizontal transverse axis (A); that
    g) at least a second hydraulic ram cylinder unit (46) is mounted on the second upright (16) and connected to the steering link unit (26) in order to control relative turning movements between the second upright (16) and the steering link unit (26) about the second horizontal transverse axis (B); and that
    h) at least a third hydraulic cylinder ram unit (62, 64) is connected between the first and second steering links (20, 22) in order to control relative turning movements between these steering links about the vertical point of articulation (C), in which the one upright (12, 116) is formed so as to be able to be anchored rigidly in one of the tracked vehicle units and the second upright (16) is formed so as to be capable of rotation in bearings in the fixture (18) in the other tracked vehicle unit about a longitudinal horizontal axis (H).

2. Arrangement according to claim 1, characterized in that the second upright (16), which is formed so as to be capable of rotation in bearings about a longitudinal horizontal axis (H) in a fixture (18) in one of the tracked vehicle units, can be maneuvered by means of a fourth hydraulic ram cylinder unit (108) in order to control mutual rotational movements between the upright in question (16) and the tracked vehicle unit.

3. Arrangement according to claim 1, characterized in that the third hydraulic ram cylinder unit (62) comprises two hydraulic manoueuvring cylinders coupled between the first and second steering links (20, 22), one of either side of these and the vertical steering pivot (24).

4. Arrangement according to claim 1, characterized in that the vertical steering pivot (24) is arranged so as to lie essentially midway between the two tracked vehicle units which are to be coupled together by the arrangement (10).

5. Arrangement according to claim 1, characterized in that the first and second hydraulic ram cylinder units (32, 46) are connected in an articulated manner with the steering link unit (26) about an axis which is coaxial with the vertical point of articulation (C).

6. Arrangement according to claim 1, characterized in that the first of the uprights (16) has a sleeve-shaped part (42) which is shaped so as to be inserted over a bearing tube (102) on the fixture (18) in the one tracked vehicle unit so as to be fixed in an axial direction but be capable of rotation about the bearing tube (102).

7. Arrangement according to claim 6, characterized in that the second of the uprights (12) has a sleeve-shaped part (28) which is shaped so as to be inserted over a bearing tube (82) on the fixture (14) in the other tracked vehicle unit so as to be locked both axially and rotationally on the tube.

8. Arrangement according to claim 7, characterized in that the sleeve-shaped part (28) of the abovementioned second upright (12) is axially lockable on the bearing tube (82) by means of a bayonet locking arrangement (84, 86).

9. Arrangement according to claim 7, characterized in that the bearing tubes (102, 82) on the respective fixtures (14, 18) are hollow in order to permit a universal drive shaft to pass through.

10. Arrangement according to claim 8, characterized in that the vertical steering pivot (24) between the steering link (20, 22) is situated above the horizontal longitudinal central axis (H) between the sleeve-shaped parts (28, 42) of the respective uprights (12, 16).

11. Arrangement according to claim 10, characterized in that the first and second horizontal transverse axes (A, B) intersect the longitudinal central axis (H).

12. Arrangement according to claim 1, characterize in that the first and second hydraulic ram cylinder units (32, 46) are mounted in bearings on the respective upright (12, 16) so as to be capable of rotation about horizontal transverse axes (D, E) which are parallel with the first and second horizontal transverse axes (A, B).

13. Arrangement according to claim 6, characterized in that the second of the uprights (116) is formed so as to be releasably attached to the associated tracked vehicle unit by means of upper and lower fixing devices (118, 120).

14. Arrangement according to claim 13, characterized in that the lower fixing device (120) is of the hook-on type while the upper fixing device contains screw connections.

15. Arrangement according to claim 1, characterized in that each of the first and second hydraulic ram cylinder units (32, 46) is formed as a combined pressure-adjustable manoeuvring ram and hydraulic shock absorber.

16. Arrangement according to claim 3, characterized in that the fourth hydraulic ram cylinder unit (108) is formed as a combined pressure-adjustable manoeuvring ram and hydraulic shock absorber.

* * * * *